March 12, 1968     R. C. DOW     3,373,331
D.C. MOTOR CONTROL CIRCUIT
Filed Feb. 23, 1965
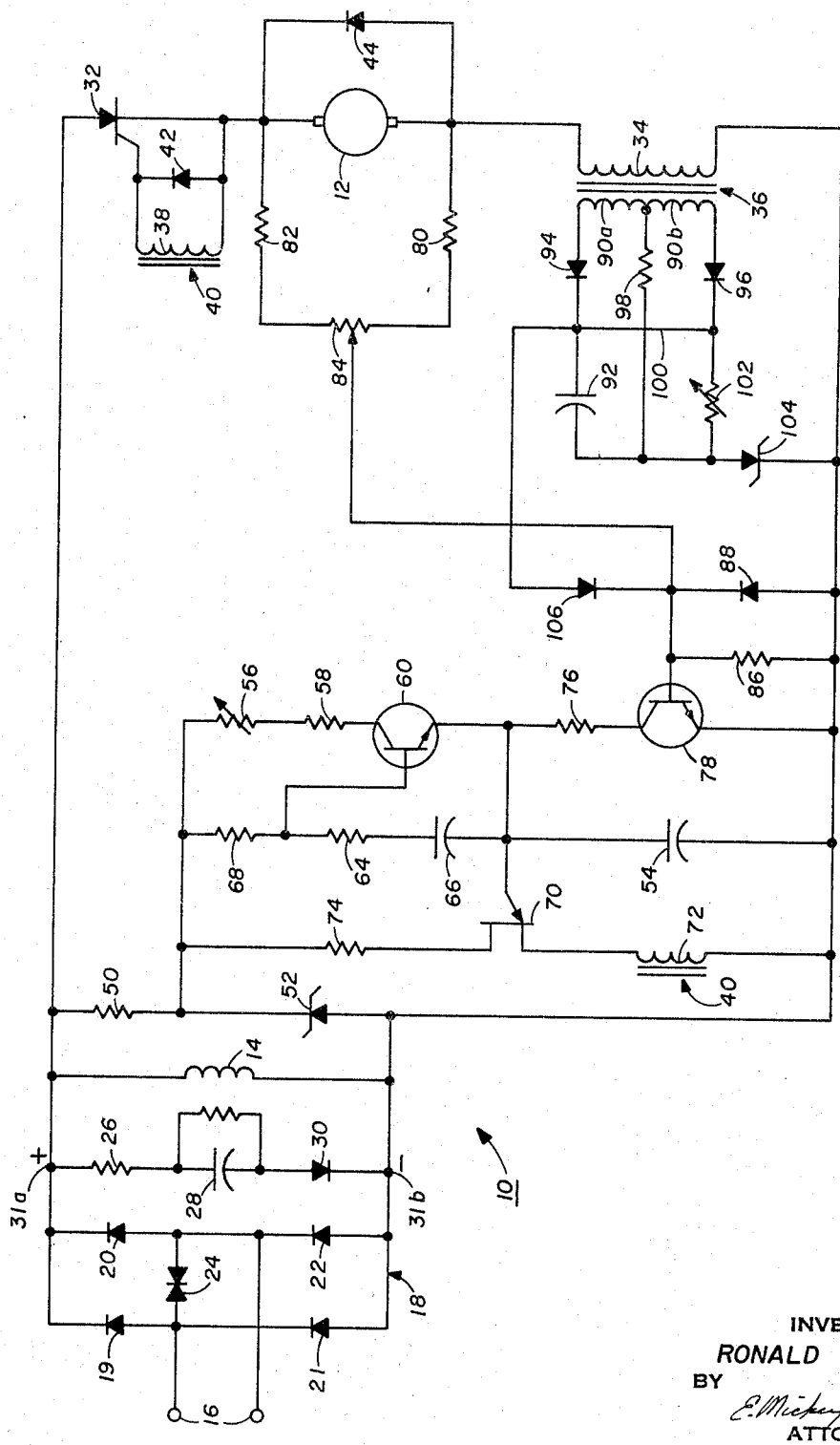
INVENTOR
RONALD C. DOW
BY
*E. Mickey Hubbard*
ATTORNEY

United States Patent Office 3,373,331
Patented Mar. 12, 1968

3,373,331
D.C. MOTOR CONTROL CIRCUIT
Ronald C. Dow, Garland, Tex., assignor to Power Engineering, Inc., Dallas, Tex., a corporation of Texas
Filed Feb. 23, 1965, Ser. No. 434,364
8 Claims. (Cl. 318—331)

ABSTRACT OF THE DISCLOSURE

A control circuit for a D.C. motor driven by a rectified A.C. power supply including an armature power circuit having a control switch in series with the armature. A reference capacitor is connected in a series discharge loop including a breakover device which conducts when the charge potential on the reference capacitor exceeds a predetermined value, in order to energize the control switch. A first circuit including a transistor is connected to the power supply and reference capacitor for charging the reference capacitor at a progressively increasing rate to progressively advance the point at which the control switching device is energized. A second circuit including a second transistor connected to the capacitor and armature power circuit decreases the charging rate of the reference capacitor in response to increases in the voltage across the armature above a predetermined value and in response to the current through the armature power circuit exceeding a predetermined value.

---

This invention relates generally to the control of electric motors, and more particularly relates to an improved circuit for controlling a D.C. motor driven by a rectified A.C. power source.

If the full power supply is instantaneously applied across the armature of a D.C. motor standing at rest, the high current levels may damage the motor. As a result, it is desirable to "soft start" the motor by slowly increasing the power applied to the armature as the armature gains speed. Similarly, the speed of a running motor should be slowly increased by a gradual increase in power.

If the power applied to a motor is held constant, the speed of the motor will vary inversely with the torque load. Accordingly, in order to maintain a constant speed under varying torque loads, it is necessary to increase the power as the torque load increases, and decrease the power as the torque load decreases. However, while maintaining a constant speed under increasing torque loads, the power must not exceed a safe value for the motor and the attendant circuit or severe damage may result to the motor even when the power circuit is fused, unless the fuse can operate to break the power circuit before the motor is damaged.

Various control circuits have been devised and proposed for performing one or more of these control functions, which have various advantages and disadvantages. However, in general the prior control circuits for accomplishing all of these control functions are relatively complex and most utilize relatively large circuit components.

Accordingly, an object of the present invention is to provide an improved control circuit for a D.C. motor which is relatively simple, compact, and inexpensive.

Another object is to provide a control circuit for "soft" starting a D.C. motor and for providing "soft" changes in speed.

A further object is to provide such a control circuit for maintaining a constant motor speed under varying torque load conditions.

Still another object is to provide such a control circuit for automatically limiting the current applied to the motor to a predetermined maximum.

Still another object of the invention is to provide a simplified, completely solid state control circuit for accomplishing all of the above functions with a minimum of components and circuits.

These and other objects are accomplished by a control circuit for a D.C. motor driven by a rectified A.C. power source which utilizes the potential of the charge on a capacitor to fire a breakover device in a discharge circuit and trigger a gate controlled switching device connected in the armature circuit at retarded times in the half-cycle of the rectified A.C. power supply and thereby vary the power applied to the armture of the motor. The capacitor is charged during each half-cycle through a soft start circuit the impedance of which slowly decreases after the circuit is energized to progressively charge the capacitor at a greater rate and thereby advance the firing angle of the gate controlled switching device. The same circuit provides "soft" change in speed in a similar manner. A second control circuit is connected in parallel with the capacitor to decrease the rate at which the capacitor charges in response to an increase in voltage. The voltage controlling the second control circuit is derived from the potential across the armature of the motor so as to maintain a constant armature speed. The voltage is also derived from a breakover circuit which responds to an excess current through the armature so as to limit the maximum torque of the motor to a safe level.

Additional, more specific aspects of the invention are hereafter pointed out with greater particularity in the following specification and appended claims, which claims are intended to provide the sole limitations upon the definition and scope of the invention.

The figure is a schematic diagram of a circuit constructed in accordance with the present invention.

Referring now to the drawing, a control circuit constructed in accordance with the present invention is indicated generally by the reference numeral 10. The circuit 10 is used to control the operation of a D.C. electric motor having an armature 12 and field coils 14. The motor is driven by a rectified A.C. power power represented by the A.C. terminals 16 and the conventional full wave rectifier bridge 18 comprised of diodes 19–22. An A.C. transient suppressor 24, such as a Thyrector, may be connected in the conventional manner. A D.C. transient loop suppressor comprised of a resistor 26, an R.C. loop 28, and a diode 30 may be connected across the rectifier 18. The resulting power from the rectifier and suppressor circuits, as represented by the terminals 31a and 31b, is a D.C. voltage comprised of a series of sine wave half-cycles, all positive.

The field coils 14 of the motor are connected across the power supply. The armature 12 is also connected across the power supply by a series power circuit comprised of a gate controlled rectifier 32, the armature 12 and the primary winding 34 of a transformer 36. The gate controlled rectifier 32 may be an SCR which is triggered "on" by a pulse generated in the secondary winding 38 of a transformer 40 which is connected from gate to cathode. A diode 42 is also connected from gate to cathode in the conventional manner to provide stable operation. A free wheeling diode 44 is connected in shunt around the armature 12 to stop armature current flow at the end of each half-cycle and permit the gate controlled rectifier to revert to cut off in the conventional manner.

A voltage of predetermined maximum level during each half-cycle for operating the control circuit is provided by a resistor 50 and a Zener diode 52 connected in series across the terminals 31a–31b. The rate at which a reference capacitor 54 is charged is controlled in one mode by a series control circuit which is connected in series with the capacitor across the Zener diode 52 and is comprised of a variable resistor 56, a fixed resistor 58, and a transistor 60. The rate at which the capacitor 54 is charged is determined by the setting of the variable resistor 56 and the impedance of the transistor 60, the rate increasing as the impedance of either decreases. The base of the transistor 60 is connected through a resistor 64 and capacitor 66 to the emitter, and is connected to the cathode of the diode 52 by the resistor 68. The rate at which the capacitor 54 is charged is also controlled by a shunt control circuit including a resistor 76 and the collector-emitter of a transistor 78 which are connected in shunt across the capacitor 54. As the impedance of transistor 78 decreases, the rate of charge of the capacitor 54 also decreases.

The capacitor 54 is discharged through a capacitor discharge circuit comprised of the base and first emitter of a unijunction transistor 70 and the primary winding 72 of transformer 40. When the potential of the charge on the capacitor exceeds the breakover voltage of the unijunction, the capacitor discharges through the primary winding and induces a voltage pulse in the secondary winding 38 to trigger the gate controlled rectifier 32 "on." Thus the angle at which the gate controlled rectifier fires is determined by the rate at which the capacitor 54 is charged. The second emitter of unijunction 70 is connected by resistor 74 to the junction between resistor 50 and Zener diode 52 to provide conventional operation of the unijunction.

Fixed resistors 80 and 82 and variable resistor 84 form a voltage divider connected across the armature 12 so that a selected portion of the voltage across the armature can be applied to the base of transistor 78. Thus as the voltage across the armature increases as a result of an increase in speed, the impedance of transistor 70 decreases to decrease the charging rate of the reference capacitor 54. A reversed diode 88 may be connected across the base and emitter of transistor 78 to protect the transistor from high voltage surges in excess of the Zener voltage of the diode.

The secondary winding of the transformer 36 is center tapped to provide windings 90a and 90b. A capacitor 92 is charged from the secondary windings 90a and 90b by a full wave rectifier comprised of diodes 94 and 96. A resistor 98 limits the current to the capacitor 92. Thus, it will be noted that when a voltage is induced in the winding 90a of a polarity to cause diode 94 to conduct, the capacitor 92 is charged through the resistor 98 back to the center tap. When the opposite polarity potential is induced in the secondary winding 90b, diode 96 conducts through crossover conductor 100 to the capacitor 92 and back through the resistor 98 to the center tap. A variable resistor 102 and the crossover conductor 100 provide a continuous discharge loop for the capacitor and the rate of discharge is controlled by the setting of resistor 102. A second breakover discharge loop for the capacitor 92 is comprised of a diode 106, resistor 86 and Zener diode 104. When the potential of the charge on the capacitor 92 exceeds the breakdown voltage of the Zener diode 104, the capacitor 92 discharges through the secondary discharge circuit and the voltage across resistor 86 biases the base of transistor 78 positive with respect to the emitter, thereby reducing the impedance of the transistor, slowing the charge rate of the reference capacitor 54, and retarding the firing angle of the gate controlled rectifier. The diode 106 prevents the voltage across the armature 12 from charging the capacitor 92 and also prevents current from flowing in the opposite direction through the capacitor discharge loop just described.

*Operation*

Assume at the start that the armature 12 of the motor is at rest and that the terminals 16 are disconnected from the A.C. power source. Capacitors 66, 54 and 92 will then be discharged, and the gate controlled rectifier 32 will be "off." When the terminals 16 are first connected to the power source, a series of positive half-cycle sine waves will be produced by the full wave rectifier 18 which will immediately energize the field 14. However, no power is applied to the armature 12 until the gate controlled rectifier 32 is triggered "on." Since there is no charge on the capacitor 66, the base of the transistor 60 will be at substantially the same potential as the emitter and the transistor will have a relatively high impedance. Similarly, since no current is passing through either resistor 80 or resistor 86, the base of transistor 78 is at substantially the same potential as the emitter and transistor 78 has a relatively high impedance. Thus, the capacitor 54 is charged by the first half-cycle at a rate determined essentially by the setting of variable resistor 56 and the impedance of the transistor 60 so that the reference capacitor 54 charges at a relatively slow rate. When the potential of the charge on the capacitor is of a sufficient magnitude to fire the unijunction 70, the capacitor 54 discharges through the primary winding 72 to induce a pulse of the proper polarity in the secondary winding 38 and turn the gate controlled rectifier 32 to "on." The relatively low initial charging rate of the capacitor 54 results in the gate controlled rectifier being triggered very late in the half-cycle so that the current applied to the armature 12 is maintained at a safe low value to initiate rotation of the armature.

The capacitor 66 is substantially greater in size than the capacitor 54 so that capacitor 66 is slowly charged by subsequent half-cycles through the resistors 68 and 64. As the capacitor 54 charges, the base of transistor 60 is slowly made positive with respect to the emitter so as to progressively decrease the impedance of the transistor. As the impedance of transistor 60 decreases, the rate at with the reference capacitor 54 is charged increases and the point during the half-cycle when the unijunction 70 triggers the gate controlled rectifier 32 advances so that the power applied to the armature 12 is progressively increased. Thus, the rate at which the capacitor 66 charges, and therefore the size of the capacitor 66, essentially determines the rate at which the power to the armature 12 is increased at start up.

The speed of the armature 12 is related to the voltage across the armature. A portion of this potential is picked off by the voltage divider comprised of resistors 80, 82 and 84, as determined by the setting of variable resistor 84, and is applied to the base of transistor 78. As the speed of the armature 12 increases and the potential across the armature increases, the base of transistor 78 is progressively made more positive with respect to the emitter so that the impedance of the transistor is progessively decreased, tending to retard the firing angle of the gate controlled rectifier 32 and slow the armature. Thus, as the speed of the armature 12 increases, the potential across the armature increases, the impedance of transistor 78 decreases, the rate at which the capacitor 54 charges decreases, and the firing angle of the gate controlled rectifier 32 is retarded to decrease the power applied to the armature 12 tending to slow the armature down. The converse happens when the speed of the armature 12 decreases, thereby tending to apply more power to the armature 12 and maintain a constant speed. Thus, as the torque load on the armature decreases and the armature tends to speed up, power is decreased, thereby holding the speed of the armature substantially constant. When the torque load is increased and the armature tends to slow down, increased power is applied to the armature to hold the speed of the armature substantially constant.

The constant speed at which the armature 12 is operated may be varied to some extent by the setting of variable resistor 84, but is preferably selected by the setting of resistor 56. In general, when the impedance of resistor 56 is increased, the charging rate of the capacitor 54 is decreased, the firing angle of the gate controlled rectifier 32 is retarded, and the armature 12 slows down. Conversely, when the impedance of resistor 56 is decreased, the charging rate of capacitor 54 increases thereby advancing the firing angle of SCR 32 and increasing the speed of armature 12. The impedance of transistor 78 merely determines the portion of the current through the transistor 60 which is shunted. Thus, even though the impedance of transistor 78 will be decreased when the impedance of resistor 56 is decreased because of the increased potential across the armature 12, the rate at which the capacitor 54 is charged will nevertheless be increased. If desired, the resistor 84 can also be adjusted to maintain the impedance of the transistor 78 approximately constant. In this regard, the resistors 56 and 84 can be operated simultaneously by a common mechanical linkage to obtain optimum operation, if desired.

When the speed of the armature 12 is changed after the armature is rotating at its selected stable speed by manipulation of the variable resistor 56, the changes in speed of the armature are not abrupt, but are relatively slow or "soft" because of the operation of the soft start circuit. In general, the transistor 60 is operating in a floating configuration at some intermediate value other than full "on" or "off." If the impedance of resistor 56 is decreased, the potential of the collector of transistor 60 increases with respect to the base thereby increasing the impedance of the transistor and offsetting the change of the resistor 56 until the charge on the capacitor 66 increases and the base potential increases. The converse happens when the resistance of resistor 56 is increased to slow the armature. As a result, any change in the setting of resistor 56 has no effect until the value of the voltage charge on capacitor 66 can accommodate the change, so that the change in the constant speed value is gradual.

As the torque load on the armature 12 increases, the motor tends to slow down, but the operation of the constant speed circuit advances the firing angle of the gate controlled rectifier 32 so that the power applied to the armature is increased. It is important that the power not exceed certain critical levels or the armature 12 and the other circuit may be damaged. For this reason, the overload circuit is provided to retard the firing angle of the gate controlled rectifier 32 after the current level through the armature has reached a predetermined maximum value. During each half-cycle of the rectified A.C. power source, a full wave is induced in the secondary windings 90a and 90b of the transformer 36. This full wave is rectified by diodes 94 and 96 and applied to charge the capacitor 92. The rate at which the capacitor is discharged is determined by the setting of the variable resistor 102. Thus, during normal operation of the armature 12, the current through the armature 12, and therefore through the primary winding 34 of transformer 36, is sufficiently low and the partial half-cycles sufficiently spaced that the potential of the charge across the capacitor 92 remains relatively low. However, as the firing angle of the gate controlled rectifier 32 is advanced, the potential across capacitor 92 progressively increases until the breakdown voltage of the Zener diode 104 is exceeded. The capacitor 92 then discharges through the circuit comprised of the diode 106, resistor 86 and Zener diode 104. The potential developed across resistor 86 by current in the discharge loop is applied to the base of transistor 78 to decrease the impedance of the transistor, decrease the rate at which capacitor 54 is charged, and thereby retard the firing angle of the gate controlled rectifier 32 to reduce the current through the armature 12. Thus, the torque overload circuit limits the maximum current through the armature 12 to a relatively safe level. If the overload persists, the fuse (not illustrated) for the system will be blown. If the torque overload should be reduced within an acceptable period of time, the circuit will continue operating as previously described.

From the above detailed description of a preferred embodiment of the invention, it will be noted that a highly simplified, fully solid state controlled circuit for a D.C. motor has been described. The control circuit provides for a soft start up to a predetermined speed which is automatically maintained under varying torque loads, provided a maximum torque load is not exceeded. Further, the constant speed is slowly changed to prevent overloading the armature as a result of rapid movement of the speed adjustment rheostat. The circuit is fully solid state and compact, and relatively inexpensive because the same components are used for various purposes so that the control system can be used for small motor applications if desired.

Although a preferred embodiment of the invention has been described in detail, it is to be understood that various changes, substitutions, and alterations can be made therein without departing from the spirit and scope of the invention as defined by the appended claims, which are intended to constitute the sole limitation upon the invention.

What is claimed is:

1. The control circuit for a D.C. motor driven by a rectified A.C. power supply comprising the combination of:

an armature power circuit for connecting the armature of the motor across the power supply including controlled switching means connected in series with the armature, a reference capacitor connected in a series discharge loop including a breakover device which conducts when the charge potential on the reference capacitor exceeds a predetermined value, the series discharge loop being coupled to the controlled switching means to turn the switching means "on" in response to discharge of the reference capacitor after the charge on the capacitor reaches the breakover potential of the breakover device, first circuit means connected to the power supply and the reference capacitor for charging the reference capacitor during each half-cycle of the power supply at a progressively inreasing rate after the control circuit is energized such that the point at which the controlled switching means is turned "on" during each half-cycle is progressively advanced, said first circuit means including a series circuit for connection across the power supply including a resistor, the collector-emitter of a transistor, and the reference capacitor, a second capacitor interconnecting the base and emitter of the transistor, a resistor connecting the base of the transistor to the positive terminal of the power supply, and second circuit means connected to the reference capacitor and coupled to the armature power circuit for decreasing the charging rate of the reference capacitor during each half-cycle to retard the point at which the controlled switching means is turned "on" in response to increases in the voltage across the armature above a predetermined value and in response to the current through the armature power circuit exceeding a predetermined value.

2. The control circuit for a D.C. motor driven by a rectified A.C. power supply comprising the combination of:

an armature power circuit for connecting the armature of the motor across the power supply including controlled switching means connected in series with the armature, a reference capacitor connected in a series discharge loop including a breakover device which conducts when the charge potential on the reference capacitor exceeds a predetermined value, the series discharge loop being coupled to the controlled switching means to turn the switching means "on" in response to discharge of the reference capacitor after the charge on the capacitor reaches the breakover potential of the breakover device, first circuit means connected to the power supply and the reference capacitor for charging the reference capacitor during each half-cycle of the power supply at a progressively increasing rate after the control circuit is energized such that the point at which the controlled switching means is turned "on" during each half-cycle is progressively advanced, and second circuit means connected to the capacitor and coupled to the armature power circuit for decreasing the charging rate of the reference capacitor during each half-cycle to retard the point at which the controlled switching means is turned "on" in response to increases in the voltage across the armature above a predetermined value and in response to the current through the armature power circuit exceeding a predetermined value, said second circuit means including a resistor and the collector-emitter of a transistor connected in series across the reference capacitor, a voltage divider network connected across the armature, and a conductor connecting a midpoint of the voltage device to the base of the transistor.

3. The control circuit combination defined in claim 1 wherein:

the controlled switching means comprises a gate controlled rectifier and means for switching the controlled rectifier "off,"

the capacitor discharging loop comprises the capacitor, the emitter and first base of a unijunction transistor, and the primary winding of a transformer connected in series, and the discharge loop is coupled to the gate controlled rectifier by said transformer, the secondary winding being connected to the gate of the controlled rectifier.

4. The control circuit combination defined in claim 2 further characterized by:

a transformer the primary winding of which is connected in series in the armature power circuit and the secondary winding of which is connected through a rectifier to charge a third capacitor, a first discharge loop connected across the third capacitor including a resistor, and a second discharge loop connected across the capacitor including a resistor and a Zener diode connected in series such that when the charge on the capacitor exceeds the Zener voltage of the Zener diode, the Zener diode will conduct and impress a voltage across the resistor, and circuit means connecting said last resistor from base to emitter of the transistor in said second circuit means whereby the impedance of the transistor will be reduced.

5. The control circuit for a D.C. motor driven by a rectified A.C. power supply which comprises the combination of:

an armature power circuit for connection across the power supply comprising a gate controlled switching means, the armature of the motor, and the primary winding of a first transformer connected in series, a reference capacitor discharge loop comprising a reference capacitor, a voltage breakover switching device, and the primary winding of a second transformer connected in series, trigger circuit means coupling the reference capacitor discharge loop to the gate controlled switching means comprising the secondary winding of the second transformer connected to apply a signal to the gate controlled switching means for turning said switching means "on" in response to discharge of the reference capacitor through the reference capacitor discharge loop, a reference capacitor charging network comprised of a series circuit including a variable resistor and the collector-emitter of a first transistor connected in series with the reference capacitor for connection across the power source and a shunt circuit comprised of a resistor and a second transistor connected across the reference capacitor, soft start control circuit means comprising a resistor and a capacitor interconnecting the base and emitter of the first transistor and a resistor for interconnecting the base of the first transistor and the positive terminal of the power supply for progressively changing the impedance of the first transistor from a relatively high value to a relatively low value as the second capacitor charges after energization of the control circuit, constant speed control circuit means comprising a voltage divider network connected across the armature of the motor and circuit means interconnecting the voltage divider and the base of the second transistor for applying a portion of the voltage across the armature to the base of the second transistor to reduce the impedance of the second transistor as the voltage across the armature increases, and current limiting circuit means comprising the secondary winding of the first transformer, a second capacitor, rectifier means interconnecting the capacitor and secondary winding for charging the capacitor, first discharge loop means connected across the second capacitor including a variable resistor for varying the discharge rate of the capacitor, and second discharge circuit means including the capacitor, a resistor and a voltage breakover device connected in series such that when the charge potential on the capacitor exceeds the breakdown potential of the breakover device, the second discharge loop will conduct and impress a voltage across the resistor, and circuit means connecting the voltage impressed across the resistor between the base and emitter of the second transistor to reduce the impedance of the second transistor when the second discharge circuit conducts.

6. In a control circuit for a D.C. motor driven by a rectified A.C. power supply, the combination of:

a power circuit including a controlled switching device and the armature of the motor connected in series for connection across the power source, a capacitor charging circuit comprising a variable resistor, the collector-emitter circuit of a transistor and a reference capacitor connected in series for connection across the power supply, a second resistor and second capacitor connected in series between the base and emitter of the transistor, and circuit means including a resistor connecting the base to the collector through the variable resistor for progressively decreasing the impedance of the transistor after the control circuit is energized to increase the charging rate of the reference capacitor, a reference capacitor discharge loop including a voltage breakover device connected across the reference capacitor for discharging the capacitor when the voltage charge exceeds a predetermined level, and means coupling the reference capacitor discharge loop to the controlled switching device to turn the controlled switching device "on" in response to discharge of the reference capacitor through the discharge loop.

7. In a control circuit for a D.C. motor driven by a rectified A.C. power supply, the combination of:

a power circuit including a controlled switching device and the armature of the motor connected in series for connection across the power source, a reference capacitor charging circuit comprising a variable resistor and a reference capacitor connected in series for connection across the power supply, a reference capacitor discharge loop including a voltage breakover device for discharging the reference capacitor when the potential of the capacitor exceeds the breakover potential of the breakover device, circuit means coupling the reference capacitor discharge loop to the controlled switching device for turning the controlled switching device "on" in response to discharge of the capacitor through the discharge loop, a shunt circuit including the collector-emitter of a transistor connected across the reference capacitor, and circuit means intercoupling the armature and the transistor for driving the base of the transistor positive with respect to the emitter in proportion to the voltage across the armature such that the impedance of the transistor will be decreased as the voltage across the armature increases.

8. In a control circuit for a D.C. motor driven by a rectified A.C. power supply, the combination of:

a power circuit including a controlled switching device and the armature of the motor connected in series for connection across the power source, a reference capacitor charging circuit comprising a variable resistor and a reference capacitor connected in series for connection across the power supply, a reference capacitor discharge loop including a voltage breakover device for discharging the reference capacitor when the potential of the capacitor exceeds the breakover potential of the breakover device, circuit means coupling the reference capacitor discharge loop to the controlled switching device for turning the controlled switching device "on" in response to discharge of the capacitor through the discharge loop, a shunt circuit including the collector-emitter of a transistor connected across the reference capacitor, and circuit means coupled to the power circuit for charging a second capacitor at a rate proportional to the current through the armature, a first discharge loop connection across the second capacitor including a variable resistance for discharging the second capacitor, a second discharge loop connected across the second capacitor including a resistance and a Zener diode connected to conduct only when the potential on the capacitor exceeds the Zener breakdown voltage of the Zener diode to produce a voltage drop across the resistor, and circuit means for connecting the voltage drop across the resistor between the base and emitter of the transistor to reduce the impedance of the transistor when the second discharge circuit conducts.

References Cited
UNITED STATES PATENTS

| | | | |
|---|---|---|---|
| 3,177,417 | 4/1965 | Wright | 318—331 |
| 3,177,418 | 4/1965 | Meng | 318—331 |
| 3,283,234 | 11/1966 | Dinger | 318—331 |

ORIS L. RADER, *Primary Examiner.*

J. J. BAKER, *Assistant Examiner.*